UNITED STATES PATENT OFFICE.

ERNEST DALLEINNE, OF NEW YORK, N. Y.

IMPROVEMENT IN METHODS OF PRODUCING ETCHINGS ON GLASS.

Specification forming part of Letters Patent No. 164,720, dated June 22, 1875; application filed May 22, 1875.

*To all whom it may concern:*

Be it known that I, ERNEST DALLEINNE, of the city, county, and State of New York, have invented a new and Improved Method of Producing Etched Ornaments on Glass, of which the following is a specification:

The object of my invention is to furnish a cheap and effective mode of producing etched ornaments on glass, so that large orders for doors, windows, &c., may be rapidly executed, and any design be multiplied mechanically without requiring specially skilled workmen. My invention consists in producing, first, the design to be etched in the usual manner on the varnished glass plate coated with opaque varnish, and employing, then, the original plate as a positive for transferring the ornamentation on a second plate covered with opaque varnish and bichromate of potassa. The second or negative plate is then used in analogous manner for the transfer of the design to any number of glass plates, so that the same may then be exposed to and etched by the acid.

Hitherto ornamental glass plates for the doors of halls, cars, &c., windows, and other purposes, required skilled artisans, as the ornamentation to be produced had to be taken out of the varnish covering by suitable tools, the parts so prepared being treated with fluoric acid, that etches thereby the surface not covered by varnish. This operation had to be performed on every glass plate, whether a large or smaller number was required, which occasioned considerable expense when large orders had to be filled.

My improved mode of transferring these ornaments requires only the production of an original plate, which is then used as a positive with which to print a negative, transferring in perfectly mechanical manner, and analogous to that used for the multiplication of drawings, maps, &c., by photographic process, the ornaments to any number of glass plates, so that the manufacture of etched glass plates may be expedited and a large number completed within a comparatively short time.

The design on the original or positive plate has to be prepared with the utmost skill to furnish a negative of corresponding accuracy. The negative plate is coated with a mixture of opaque varnish and bichromate of potassa, or its equivalent, and exposed with the positive plate to the action of the light. The passage of the light through the uncovered parts renders the bichromate of potassa on the second plate insoluble, and admits the removing or washing off with turpentine of the parts of the coating not acted upon by the rays of the sun. The ornaments are thus produced on the negative in perfect manner, to be then transferred to any number of glass plates in analogous manner by covering them with varnish and bichromate of potassa.

The design on the negative plate prevents the passage of the light, while all the remaining portion or ground is acted upon. Thus the design may be readily washed out by the turpentine, and then etched in the customary manner by fluoric acid. By retaining the negative plate any number of glass plates having the same ornamentation may be furnished at any time and at reduced rates, in similar manner as in photography.

Having thus described my invention, I claim as new and desire to secure by Letters Patent—

The method herein described of producing etched glass plates, consisting mainly in transferring the design from the original or positive plate to a second or negative plate, coated with varnish and bichromate of potash, then removing the ground by means of turpentine, then using the negative to produce the ornaments, in similar manner, on any number of glass plates, and finally etching the same with fluoric acid, substantially in the manner and for the purpose set forth.

ERNEST DALLEINNE.

Witnesses:
PAUL GOEPEL,
H. N. SMITH.